United States Patent [19]

Takahashi et al.

[11] Patent Number: 4,951,363
[45] Date of Patent: Aug. 28, 1990

[54] HOSE CLAMP

[75] Inventors: Yasuo Takahashi; Toshinari Hojima, both of Yokohama, Japan

[73] Assignee: Kato Hatsujo Kaisha, Ltd., Kanagawa, Japan

[21] Appl. No.: 383,152

[22] Filed: Jul. 19, 1989

[30] Foreign Application Priority Data

Aug. 9, 1988 [JP] Japan ............................ 63-104991[U]
Aug. 9, 1988 [JP] Japan ............................ 63-104992[U]

[51] Int. Cl.⁵ .......................................... B65D 63/02
[52] U.S. Cl. ................... 24/20 R; 24/20 TT; 24/23 EE
[58] Field of Search ............ 24/20 R, 20 TT, 20 CW, 24/20 W, 20 EE, 20 S, 23 EE; 81/9.3, 3.43; 285/23, 39

[56] References Cited

U.S. PATENT DOCUMENTS

| | | | |
|---|---|---|---|
| 1,186,809 | 6/1916 | McChesney | 81/9.3 |
| 1,472,966 | 11/1923 | Englund | 24/20 TT |
| 1,776,783 | 9/1930 | Cornell, Jr. | 24/23 EE |
| 1,965,207 | 7/1934 | Walker | 24/20 TT |
| 2,018,906 | 10/1935 | Winter | 81/9.3 |
| 3,008,206 | 11/1961 | Meese et al. | |
| 3,038,230 | 6/1962 | Henning | |
| 3,082,498 | 3/1963 | Oetiker | |
| 3,106,757 | 10/1963 | Thurston et al. | |
| 3,295,176 | 1/1967 | Bright | |
| 3,429,605 | 2/1969 | Soesbergen | 24/20 TT |
| 4,305,179 | 12/1981 | Sakurada | |

FOREIGN PATENT DOCUMENTS 52-14511  4/1977  Japan .
432957    9/1967  Switzerland ............ 24/20 TT Primary Examiner—Victor N. Sakran
Attorney, Agent, or Firm—Wenderoth, Lind & Ponack

[57] ABSTRACT

A hose clamp includes a clamp body having an annular ring part for fastening a hose and a pair of grip parts for filling the role of radially expanding the ring part, and a separately formed holder. The holder is inserted around the pair of grip parts and is capable of retaining the pair of grip parts in a closely adjacent state. The holder is provided integrally with means for removal of the holder from the pair of grip parts retained in the closely adjacent state.

7 Claims, 7 Drawing Sheets

HOSE CLAMP

BACKGROUND OF THE INVENTION AND RELATED ART STATEMENT

This invention relates to a hose clamp used for binding in place a rubber hose, for example.

The hose clamps of this type which have come into use to date will be explained. First, the hose clamp disclosed in U.S. Pat. No. 3,008,206 is cited. In this hose clamp, a clamp body comprising an annular clamping ring part and a pair of grip parts is formed of a resilient wire of a circular cross section. This is the most primitive of all of the hose clamps. It has a problem in that when it binds a given rubber hose, it exerts a concentrated stress upon the bound portion of the rubber hose and accelerates the aging or deterioration of the rubber hose.

As a solution for the problem, the hose clamp disclosed in U.S. Pat. No. 3,038,230 has been proposed. This hose clamp comprises a clamp body formed of a resilient flat sheet material and screw members adapted to link the opposite terminal parts of the clamp body, so that the binding force of the clamp body may be adjusted by adjusting the amount of helical engagement of the screw members. It is, therefore, capable of repressing or curbing otherwise possible concentration of stress upon the bound portion of a rubber hose. Conversely, however, it entails a disadvantage in that the opposite terminal parts of the clamp body are required to allow for extra spaces for accommodation of the screw members and that assembly of the hose clamp requires an unduly large number of steps.

Thus, the hose clamps disclosed in U.S. Pat. No. 3,082,498, No. 3,106,757 and No. 3,295,176 have been proposed. These hose clamps invariably comprise an annular clamp body formed of a resilient flat sheet material and adapted to have part of the circular wall thereof projected outwardly in such a manner that when the opposite sides of the projected wall are squeezed toward each other with a jig, the clamp body is contracted radially and allowed to exert a binding force upon the rubber hose. Therefore, they entail a disadvantage in that since the amount of this radial contraction of the clamp body has its limit, the rubber hoses capable of being bound by these hose clamps automatically have their dimensional limits.

In recent years, therefore, the hose clamp disclosed in U.S. Pat. No. 4,305,179 has come to find increasing utility. In this hose clamp, a clamp body formed of a resilient flat sheet material cut in a prescribed shape comprises an annular clamping ring part and a pair of grip parts raised from the opposite terminal parts of the ring part and extended in mutually opposite directions. Owing to this construction, this hose clamp is capable of repressing or curbing the otherwise possible concentration of stress during the course of clamping to the fullest possible extent and allowing for appreciable freedom in the variation of the diameter of the clamping ring part.

In this hose clamp, however, during the course of the work of inserting a rubber hose inside the clamping ring part, the clamping ring part must be expanded radially by squeezing the pair of grip parts toward each other with a tool. The field workers have expressed a desire for this hose clamp to be improved so as to eliminate the inconvenience encountered in this inevitable work of imparting a radial expansion to the ring part.

As an answer to this demand, the hose clamp disclosed in Japanese Utility Model Pulication No. SHO 52-14511 has been proposed and is shown in FIG. 1.

In this hose clamp, a clamp body 1 formed of a resilient flat sheet material cut in a prescribed shape comprises an annular clamping ring part 2 for clamping a rubber hose and a pair of grip parts 3a and 3b raised from the opposite terminal parts of the ring part 2 and extended in mutually opposite directions. The hose clamp is separately provided with a holder 4 formed in a U-shaped cross section and adapted to retain the pair of grip parts 3a and 3b in a mutually closely adjacent relationship in spite of their resilient force.

When this hose clamp is put to actual use, the clamping ring part 2 is radially expanded in advance by inserting the holder 4 around the pair of grip parts 3a and 3b in a state urged toward each other, thereby temporarily retaining the grip parts 3a and 3b in the closely adjacent state. Then, the rubber hose is inserted into the radially expanded clamping ring part 2 and fitted on the terminal part of a connection pipe. Now, the holder 4 is removed from the pair of grip parts 3a and 3b to relieve the pair of grip parts 3a and 3b of their mutual approximation and allow the clamping ring part 2 to be radially contracted automatically by the resilient force of its own, with the result that the rubber hose is bound fast on the connection pipe infallibly.

With this hose clamp, however, in removing the holder 4 from the pair of grip parts 3a and 3b to radially contract the clamping ring part 2 automatically, it is absolutely necessary for the field worker to rely on a tool such as pliers. With such a tool the U-shaped holder 4 is nipped strongly at its opposite lateral walls and in this state is forcibly pulled upwardly out of place. This operation requires the field worker to exert both a nipping force and a pulling force on the holder 4. Undeniably, therefore, the operation actually calls for much time and labor and naturally proves quite irksome. Particularly at a work site of narrow space, the problem of inferior workability described above becomes amplified when the field worker is assigned to manipulate a number of such holders 4.

OBJECT AND SUMMARY OF THE INVENTION

The main object of this invention is to provide a hose clamp having a construction such that a holder can be readily removed from a pair of grip parts.

To attain this object, according to this invention there is provided a hose clamp comprising a clamp body composed of a ring part for fastening a hose and a pair of grip parts for filling the role of radially expanding the ring part, and a separately formed holder being inserted around the pair of grip parts and capable of retaining the pair of grip parts in a closely adjacent state, the holder being provided integrally with means for removal of the holder from the pair of grip parts retained in the closely adjacent state.

The holder removing means comprises a pulling arm piece capable of being directly held in a hand, whereby the holder is removed from the pair of grip parts by means of the pulling arm piece. It may otherwise comprise at least one engaging hole formed in the holder for permitting engaging insertion therein of the leading end of a simple tool, whereby the holder is removed from the pair of grip parts by rotating the simple tool having the leading end thereof engaged in the engaging hole.

The above and other objects, characteristic features and abvantages of the present invention will be described more specifically below with reference to the accompanying drawings.

DETAILED DESCRIPTION OF THE PREFERRED EMBODIMENTS

Now, the present invention will be described in detail below with reference to the preferred embodiments illustrated in the accompanying drawings.

Figure 1:
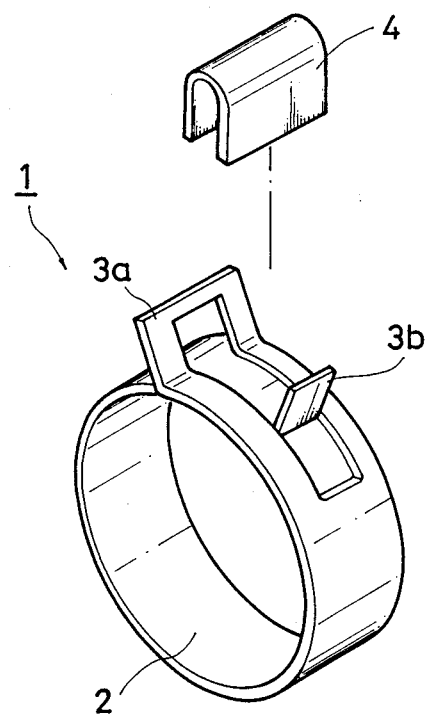
FIG. 1 is an exploded perspective view illustrating a prior art hose clamp.
Figure 2:
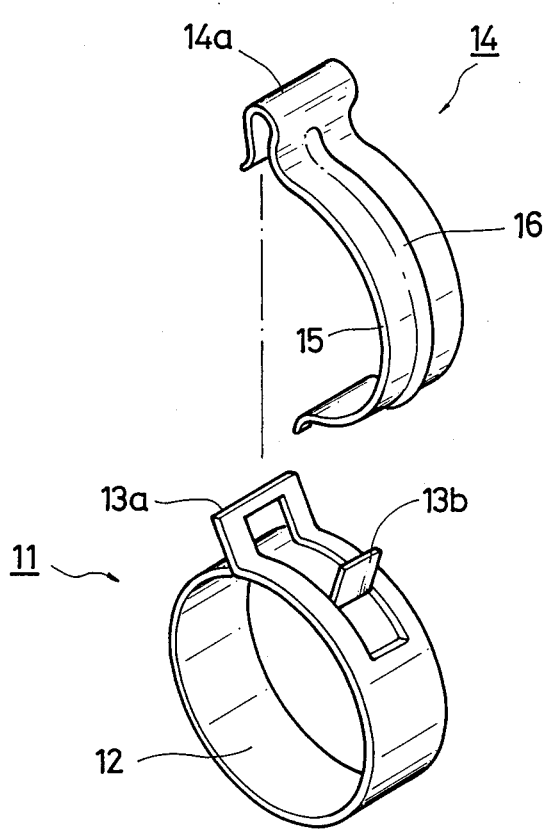
FIG. 2 is an exploded perspective view illustrating one embodiment of the hose clamp according to the present invention.
Figure 3A:
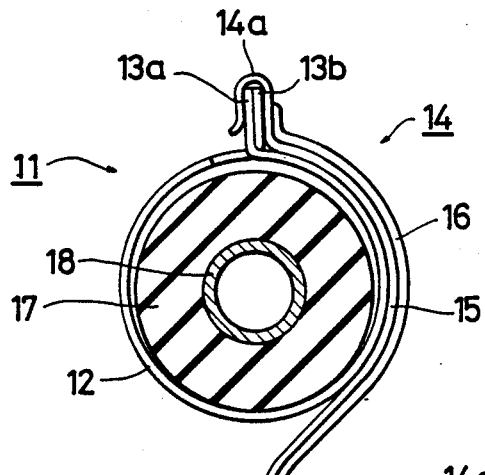
FIG. 3A is a front view illustrating a ring part of the hose clamp of FIG. 2 radially expanded by a holder of the hose clamp, with a rubber hose and a connection pipe shown in cross-section.

The hose clamp contemplated as the first embodiment shown in FIGS. 2 and 3, is similar to the prior art hose clamp, in that it comprises a clamp body 11 formed of a resilient flat sheet material and including an annular fastening ring part 12 and a pair of grip parts 13a and 13b adapted to fill the role of radially expanding the ring part 12 as illustrated in FIG. 3A. This hose clamp is further provided with a separately formed holder 14 by means of which the pair of grip parts 13a and 13b can be retained in a closely adjacent state. It is claracterized by providing the holder 14 with means for removing the holder 14 from the pair of grip parts 13a and 13b.

Specifically in the first embodiment, the holder removing means comprises a curved pulling arm piece 15 extending integrally from one end of a holder body 14a of a U-shaped cross section and having a strip of reinforcing bead 16 formed in the central part thereof in the longitudinal direction. The holder body 14a of the holder 14 can be readily removed from the pair of grip parts 13a and 13b by taking hold of the free end of the pulling arm piece 15 and pulling the entire arm piece 15 upwardly. As illustrated in FIG. 3A, the pulling arm piece 15 is formed in the shape of a strap long enough to be hung down along the annular contour of the fastening ring part 12. Optionally, however, it may be formed in a smaller length insofar as it is of a shape capable of being readily held fast in a hand.

Figure 3B:
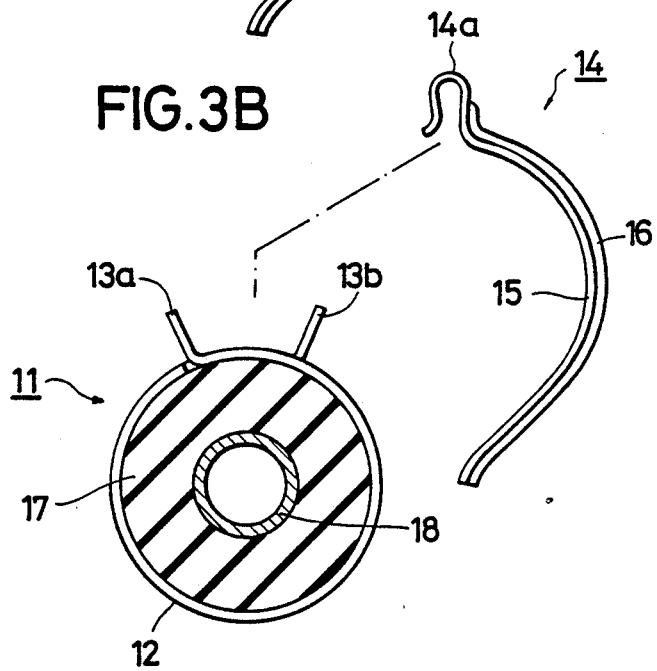
FIG. 3B is a front view illustrating the ring part radially contracted by removal of the holder, with the rubber hose and connection pipe shown in cross-section.

The use of the hose clamp constructed as described above in fastening a rubber hose 17 to the end of a connection pipe 18 is effected, as practiced heretofore and as illustrated in FIG. 3A, by inserting the holder body 14a around the pair of mutually approaching grip parts 13a and 13b, thereby radially expanding the fastening ring part 12 forcibly, then inserting the rubber hose 17 inside the radially expanded ring part 12, subsequently fitting the rubber hose 17 around the end of the connection pipe 18, and finally removing the holder 14 from the pair of grip parts 13a and 13b utilizing the pulling arm piece 15 serving as the holder removing means. Consequently, the pair of grip parts 13a and 13b are released from the mutually approaching state and the fastening ring part 12 is automatically contracted radially by its own resilient force to tighten the outer periphery of the rubber hose 17 infallibly as illustrated in FIG. 3B. As a result, the hose 17 is infallibly fastened to the end of the connection pipe 18.

In the first embodiment, since the pulling arm piece 15 serving as the holder removing means integrally extends downwardly from one end of the holder body 14a as described above, a worker can remove the holder 14 very readily from the pair of grip parts 13a and 13b, even in the case where the work site is so narrow as to prohibit use of a tool such as pliers, by bringing his hand to the hose clamp, directly taking hold of the pulling arm piece 15 on the holder, and forcibly pulling the arm piece 15 upwardly. Thus, the holder removing operation is very easy and simple as compared with the conventional operation. Since this removing operation has absolutely no use for such a tool as pliers, the worker is no longer required to prepare the tool every time the removing operation is to be effected, and the removing operation can be finished quickly.

Furthermore, since the pulling arm piece 15 has the reinforcing bead 16 formed integrally thereon, there will be absolutely no possibility of the pulling arm piece 15 being accidentally bent during the course of the operation. It is, therefore, sufficiently reusable.

Figure 4:
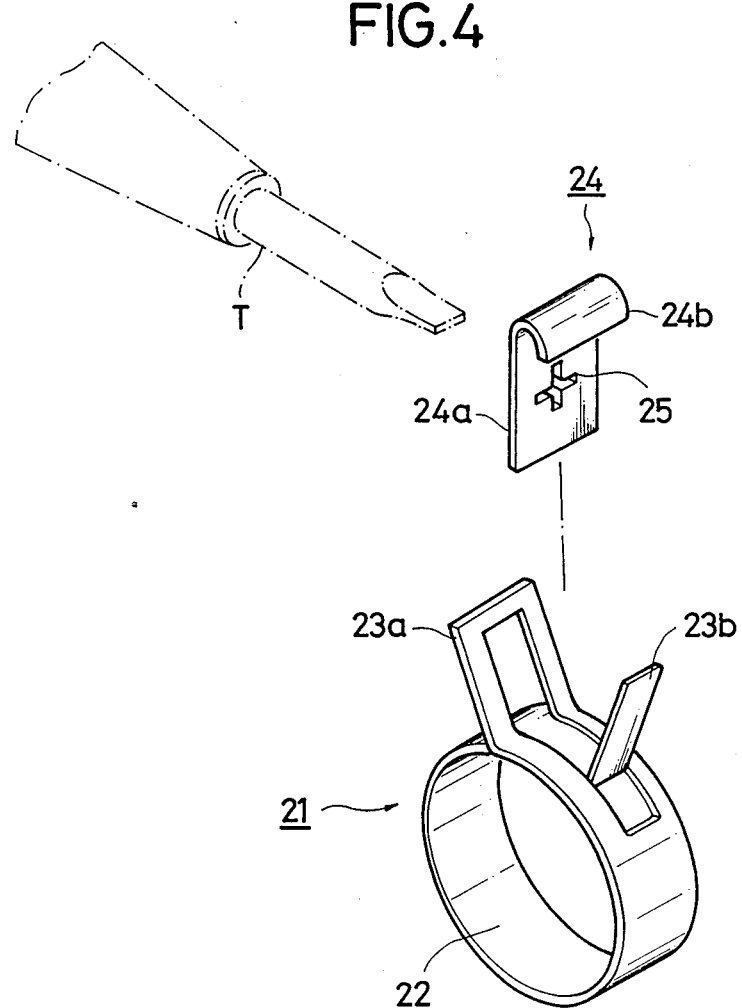
FIG. 4 is an exploded perspective view illustrating another embodiment of the hose clamp according to the present invention.

Now, the hose clamp contemplated as the second embodiment of this invention will be described. As illustrated in FIGS. 4 to 6, the hose clamp of this embodiment has a construction in which a clamp body 21 formed of a resilient flat sheet material comprises an annular fastening ring part 22 and a pair of grip parts 23a and 23b adapted to fill the role of radially expanding the ring part 22 and in which a separately formed holder 24 is adapted to play the role for retaining the pair of grip parts 23a and 23b in a closely adjacent state. This hose clamp is characterized by forming the holder 24 such that it has a substantially J-shaped cross section and providing the holder 24 with an engaging hole 25 which serves as means for removing the holder 24 from the grip parts 23a and 23b.

Specifically in the second embodiment, the holder 24 has a first lateral wall 24a of a larger length and a second lateral wall 24b of a smaller length and is substantially J-shaped as a whole. The engaging hole 25 is formed in a cruciform in the first lateral wall 24a of the holder 24 as illustrated in FIG. 4 so as to permit engaging insertion therein of the leading end of either a Phillips screwdriver or a slotted screwdriver. With this construction, the removal of the holder 24 from the pair of grip parts 23a and 23b can be effected easily by rotating a simple tool T such as a screwdriver whose leading end is inserted into the engaging hole 25.

Figure 5A:
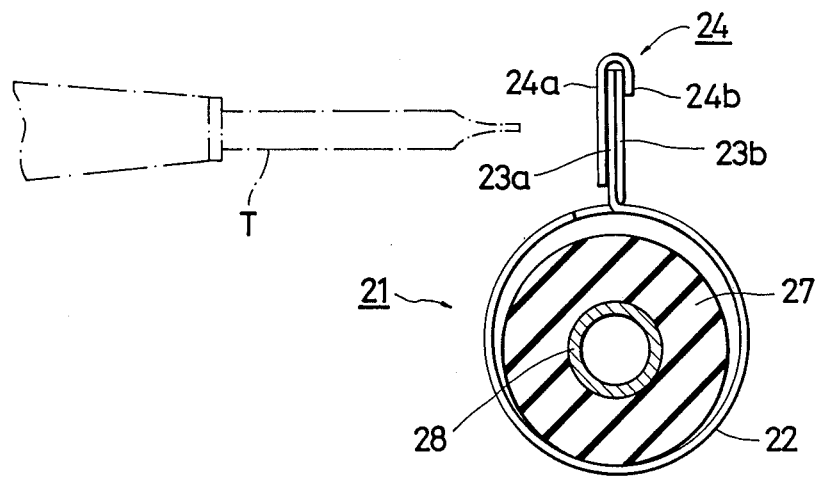
FIG. 5A is a front view illustrating a ring part of the hose clamp of FIG. 4 radially expanded by a holder of the same hose clamp, with a rubber hose and a connection pipe shown in cross-section.
Figure 5B:
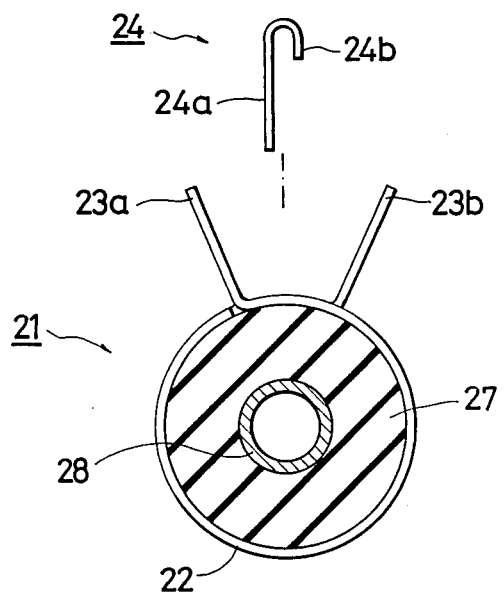
FIG. 5B is a front view illustrating the ring part radially contracted by removal of the holder, with the rubber hose and connection pipe shown in cross-section.

The fastening of a rubber hose 27 to the end of a connection pipe 28 by the use of the hose clamp of the second embodiment is accomplished by inserting the holder 24 around the pair of closely adjacent grip parts 23a and 23b as illustrated in FIG. 5A, thereby forcibly causing radial expansion of the fastening ring part 22, inserting the rubber hose 27 inside the radially expanded ring part 22, fitting the rubber hose 27 around the end of the connection pipe 28, and removing the holder 24 from the pair of grip parts 23a and 23b. Consequently, the pair of grip part 23a and 23b are released from their closely adjacent state and the fastening ring part 22 is automatically contracted radially by virtue of its own resiliency to clamp the outer periphery of the rubber hose 27 infallibly. Thus, the hose 27 is fastened to the end of the connection pipe 28 without fail.

Figure 6A:
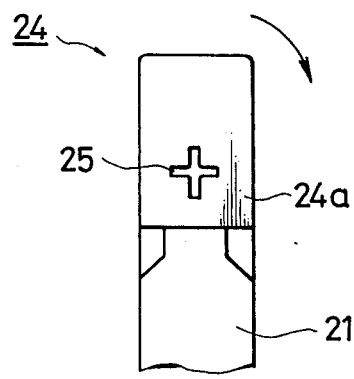
FIG. 6A and FIG. 6B are explanatory views illustrating an operation for removing the holder of FIG. 4.
Figure 6B:
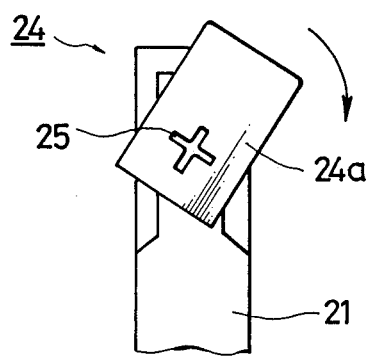

In the second embodiment, since the engaging hole 25 is formed in the first lateral wall 24a of the holder 24 which is larger than the second lateral wall 24b as already described, the removal of the holder 24 from the pair of grip parts 23a and 23b is readily attained simply by bringing the leading end of the simple tool T such as a screwdriver into the engaging hole 25 and subsequently rotating the simple tool T, thereby causing the rotation of the holder 24 in a prescribed direction as illustrated in FIGS. 6A and 6B without requiring the first and second lateral walls 24a and 24b of the holder 24 to be powerfully nipped and pulled out by the use of such pliers as conventionally practiced. The operation for the removal of the holder 24, therefore, is accomplished readily and quickly without as much labor as normally required for by the conventional operation.

Furthermore, in the second embodiment, since the second lateral wall 24b of the holder 24 has a smaller length, it readily comes off the associated grip part and the holder 24 is immediately released from the inserted state after the holder 24 is rotated to a certain angle. Even from this point of view, the operation of removal of the holder 24 promises a saving of labor.

Figure 7A:
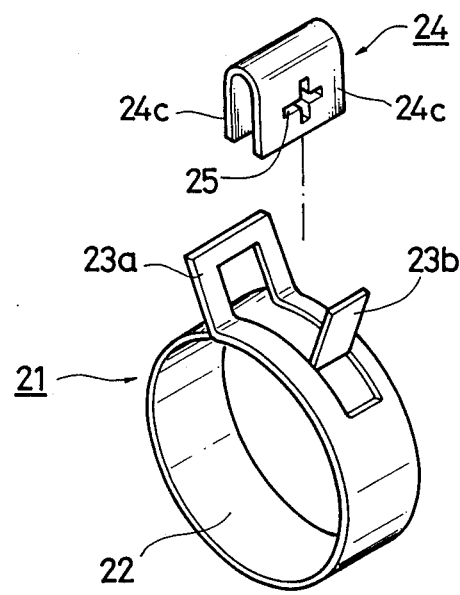
FIG. 7A is an exploded perspective view illustrating still another embodiment of the hose clamp according to the present invention.
Figure 7B:
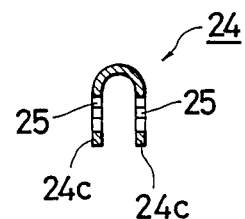
FIG. 7B is a cross section of a hose clamp holder of the hose shown in FIG. 7A.

The hose clamp of the third embodiment of this invention will now be described with reference to FIGS. 7A and 7B. In this embodiment, the hose clamp is a modification of that of the second embodiment. It differs from the hose clamp of the second embodiment in that the holder 24 is formed with a substantially U-shaped cross-section similar to its conventional counterpart and that two engaging holes 25 for permitting engaging insertion therein of the leading end of a screwdriver are formed respectively in each of the opposite lateral walls 24c which are of an equal size, so that the simple tool T such as a screwdriver may be used on either side of the holder 24.

In the third embodiment, therefore, the removal of the holder 24 from the pair of grip parts 23a and 23b can be readily accomplished by simply rotating the simple tool T, such as a screwdriver, without requiring the opposite lateral walls 24c of the holder 24 to be strongly nipped and pulled upwardly by the use of a nipping tool such as pliers. The operation for the removal of the holder 24 can be accomplished rapidly with less labor in a manner similarly to the operation of the second embodiment. Particularly in the third embodiment, the direction in which the simple tool T, such as a screwdriver is used can be suitably selected by taking into consideration the conditions of the work site. From this point view, the operation becomes all the more convenient.

As described in the foregoing, the hose clamp according to the present invention is characterized in that the holder for retaining the pair of grip parts in a closely adjacent state is provided with means for the removal of the holder from the grip parts held in a closely adjacent state. The removal of the holder from the pair of grip parts, therefore, is attained very easily without requiring the hard toil heretofore endured in the operation of strongly nipping the opposite lateral walls of the holder and, at the same time, pulling out the holder upwardly by the use of a nipping tool such as pliers. Thus, the operation of removing the holder can be carried out readily and rapidly without requiring any notable human power as compared with the operation heretofore performed.

What is claimed is:

1. A hose clamp comprising:
   a clamp body including a normally contracted expandable annular ring part and means, comprising a pair of grip parts mounted to said ring part, for expanding said ring part;
   means, comprising a holder, having a substantially U-shaped portion, formed separate from said clamp body, for engaging said pair of grip parts and releasably retaining said pair of grip parts in a mutually closely adjacent relationship to thereby releasably retain said ring part in an expanded state; and
   an elongated pulling arm piece integrally connected to said U-shaped portion of said holder and adapted to be held in a hand and manipulated so as to release said pair of grip parts from engagement in said engaging means.

2. A hose clamp as recited in claim 1, wherein said pulling arm piece has a curved shape adapted to extend about a portion of said ring part when said engaging means is engaging said pair of grip parts.

3. A hose clamp as recited in claim 1, further comprising
   means for reinforcing said pulling arm piece against bending.

4. A hose clamp as recited in claim 3, wherein said reinforcing means comprises a reinforcing bead formed longitudinally along said pulling arm piece.

5. A hose clamp comprising:
   a clamp body including a normally contracted expandable annular ring part and means, comprising a pair of grip parts mounted to said ring part, for expanding said ring part;
   means, comprising a holder, having a substantially U-shaped portion, formed separate from said clamp body, for engaging said pair of grip parts and releasably retaining said pair of grip parts in a mutually closely adjacent relationship to thereby releasably retain said ring part in an expanded state; and
   said holder having two opposing walls and means, comprising an engaging hole formed through one of said walls, for allowing said holder to be rotated by a simple tool inserted in said engaging hole so as to release said pair of grip parts from engagement in said engaging means, one of said two opposing walls being longer than the other of said two opposing walls such that said holder is J-shaped.

6. A hose clamp as recited in claim 5, wherein said engaging hole is cruciform-shaped.

7. A hose clamp comprising:
   a clamp body including a normally contracted expandable annular ring part and means, comprising a pair of grip parts mounted to said ring part, for expanding said ring part;
   means, comprising a holder, having a substantially U-shaped portion, formed separate from said clamp body, for engaging said pair of grip parts and releasably retaining said pair of grip parts in a mutually closely adjacent relationship to thereby releasably retain said ring part in an expanded state; and said holder having two opposing walls and means, comprising a first engaging hole formed through one of said two walls and a second engaging hole formed through the other of said two walls, for allowing said holder to be rotated by a simple tool inserted selectively in one of said first and second engaging holes so as to release said pair of grip parts from engagement in said engaging means, at least one of said first and second engaging holes being cruciform-shaped.

* * * * *